United States Patent
Chiu et al.

(10) Patent No.: US 7,230,924 B2
(45) Date of Patent: Jun. 12, 2007

(54) METHOD AND APPARATUS FOR COMMUNICATIONS TRAFFIC ENGINEERING

(75) Inventors: Angela L. Chiu, Holmdel, NJ (US); Seyhan Civanlar, Middletown Township, Monmouth County, NJ (US); Leonard L. Lu, Holmdel, NJ (US); Zhuangbo Tang, Tinton Falls, NJ (US)

(73) Assignee: AT&T Corp., New York, NY (US)

( * ) Notice: Subject to any disclaimer, the term of this patent is extended or adjusted under 35 U.S.C. 154(b) by 725 days.

(21) Appl. No.: 09/819,555

(22) Filed: Mar. 28, 2001

(65) Prior Publication Data

US 2002/0186658 A1 Dec. 12, 2002

(51) Int. Cl.
*H04L 12/26* (2006.01)

(52) U.S. Cl. .................. 370/237; 379/221.03; 709/242

(58) Field of Classification Search ......... 370/229–230, 370/230.1, 231–235, 235.1–236, 236.1, 236.2–238, 370/238.1–240, 242, 328, 351–352, 395.4, 370/401, 522; 379/219, 221.03, 221.04; 709/239–242
See application file for complete search history.

(56) References Cited

U.S. PATENT DOCUMENTS 5,164,938 A * 11/1992 Jurkevich et al. .......... 370/231
5,689,646 A * 11/1997 Thorson ..................... 709/239
5,854,899 A   12/1998 Callon et al.
5,872,773 A    2/1999 Katzela et al.
6,195,354 B1 *  2/2001 Skalecki et al. ........ 370/395.32
6,574,195 B2 *  6/2003 Roberts ...................... 370/235
6,778,496 B1 *  8/2004 Meempat et al. ........... 370/230
6,795,399 B1 *  9/2004 Benmohamed et al. ..... 370/235

FOREIGN PATENT DOCUMENTS

WO    WO 01/20829 A1    3/2001

OTHER PUBLICATIONS

D. Awduche et al., "Requirements for Traffic Engineering Over MPLS", Sep. 1999, pp. 1–30, Network Working Group, IETF Standard, Internet Engineering Task Force.

* cited by examiner

*Primary Examiner*—Ajit Patel
*Assistant Examiner*—John Shew
(74) *Attorney, Agent, or Firm*—Michael Haynes PLC; Michael N. Haynes; Dale R. Jensen

(57) ABSTRACT

This invention provides for a technique for selectively off-loading traffic from congested sub-regions of a network to more lightly-loaded regions by making use of Multiprotocol Label Switching (MPLS). For each network element, an Interior Gateway Protocol (IGP) routing is employed to provide re-routing and to identify congested links caused by re-routed trunks for each single failure. The re-routed traffic is then analyzed and alternate Label Switched Paths (LSPs) are identified for such traffic trunks so that the traffic is directed to the alternate LSPs during the single failure event.

31 Claims, 8 Drawing Sheets

METHOD AND APPARATUS FOR COMMUNICATIONS TRAFFIC ENGINEERING

BACKGROUND OF THE INVENTION

1. Field of Invention

This invention relates to a method and apparatus for engineering communications traffic.

2. Description of Related Art

Modern communications networks transport large volumes of information between various locations in a network. Unfortunately, the traffic across any particular link in a given communications network can represent a considerable volume of information; and as the network transports increasingly more traffic, congestion across various links may cause delays in data delivery. Further, link failures and subsequent rerouting may contribute to network link congestion.

Presently, most conventional network routing protocols, such as OSPF (Open Shortest Path First), use a shortest path first routing scheme to alleviate network congestion and otherwise manage network traffic. Unfortunately, these protocol systems lack versatility, as the process of determining alternate paths upon the occurrence of network link failure or link congestion is often excessively time consuming, and the performance of the resulting traffic flow has been difficult to gauge. Thus, new technology to manage networks is desirable.

SUMMARY OF THE INVENTION

This invention provides systems and methods for selectively off-loading appropriate amounts of traffic from congested sub-regions of a network to more lightly loaded sub-regions of the network by applying explicitly routed label switching paths (ER-LSP) of a label switching technology, hereinafter referred to as Multiprotocol Label Switching (MPLS) technology. Accordingly, using MPLS technology, traffic trunks containing lightly loaded links can be selected and traffic can be rerouted to the lightly loaded links with an uneven load-splitting ratio to alleviate congestion. In particular, traffic is rapidly redistributed to ensure that every link's utilization, within a given path, is below designated maximum values. Consequently, MPLS technology permits the effective utilization of network resources.

These and other aspects of the invention will be apparent or obvious from the following description.

BRIEF DESCRIPTION OF THE DRAWINGS

The invention is described in detail with reference to the following figures, wherein like numerals reference like elements, and wherein.

DETAILED DESCRIPTION OF EXEMPLARY EMBODIMENTS

Conventional networking systems are routinely subject to localized or regional network congestion as network traffic loads vary according to user demands and/or network resource allocations. For example, congestion may occur from traffic being rerouted around network element failures within the system, thus impacting the data delivery and transit times.

It is appreciated that conventional rerouting schemes typically rely on simple Open-Shortest-Path-First (OSPF) technology or Intermediate-System to Intermediate-System (IS—IS) protocol metrics, etc., to reroute traffic and/or to gauge traffic flows in a network. However, these methods suffer from not being able to provide rapid and efficient rerouting schemes.

Multiprotocol Label Switching (MPLS) technology mitigates many of the shortcomings of conventional congestion management schemes by permitting the selective off-loading of appropriate amounts of traffic from congested paths of sub-regions of a network to more lightly loaded paths of sub-regions of the network in a rapid manner. Using various congestion profile measurement/rerouting schemes, the explicit routing label switching paths (ER-LSP) capabilities of MPLS technology are used to enable "uneven" load-splitting of traffic over arbitrary paths to reroute traffic in a more efficient manner. For the remainder of the description, the paths designated for congestion management rerouting are referred to as primary Label Switching Paths (LSPs), while the paths designated for rerouting around an element failure or congestion in a primary LSP are referred to as alternate LSPs. This invention is capable of generating primary LSP templates and alternate LSP templates for network traffic management.

Figure 1:
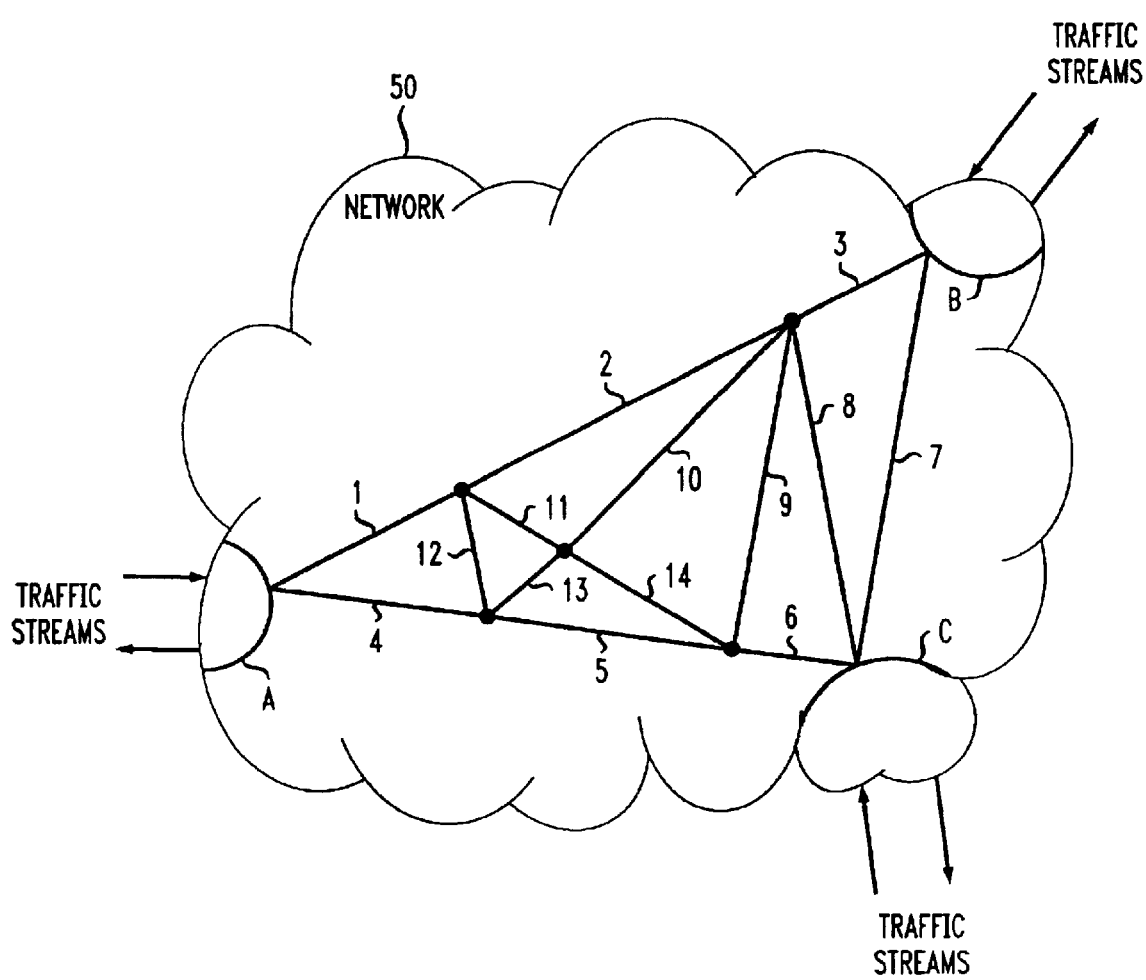
FIG. 1 is a diagram illustrating a communications network using a prior art OSPF network routing method.

FIG. 1 illustrates a simple network 50, ingressing and egressing routers A, B, C and links 1–14, with traffic flow routed in a conventional OSPF manner. It is understood, in the context of this discussion, that traffic in a network can be defined as being associated with a traffic trunk, where the traffic trunk is an aggregated traffic stream primarily defined by its ingress and egress routers. That is, traffic in a traffic trunk may be associated with a source address corresponding to an ingress router and a destination address corresponding to an egress router. Therefore, the term traffic trunk can be used to generically refer to the aggregated traffic streams that enter or exit a network. Table 1 demonstrates the various traffic in the simple network 50 and the links comprising the paths used in a conventional OSPF routing scheme.

TABLE 1

| Traffic Trunks | Paths from Originating Router A | Paths from Originating Router B | Paths from Originating Router C |
|---|---|---|---|
| B ⇔ A | 1-2-3 | 3-2-1 | |
| C ⇔ B | | 7 | 7 |
| A ⇔ C | 4-5-6 | | 6-5-4 |

If, for example, link 5 fails, conventional OSPF routing schemes will reroute traffic away from link 5, thereby causing traffic trunk designated in the flow direction of A→C to flow along rerouted paths 4-13-14-6. It should be apparent, however, that if all traffic is eliminated from link 5 and if link 13 is not able to properly absorb the amount of newly rerouted traffic, then congestion may occur in link 13.

Figure 2:
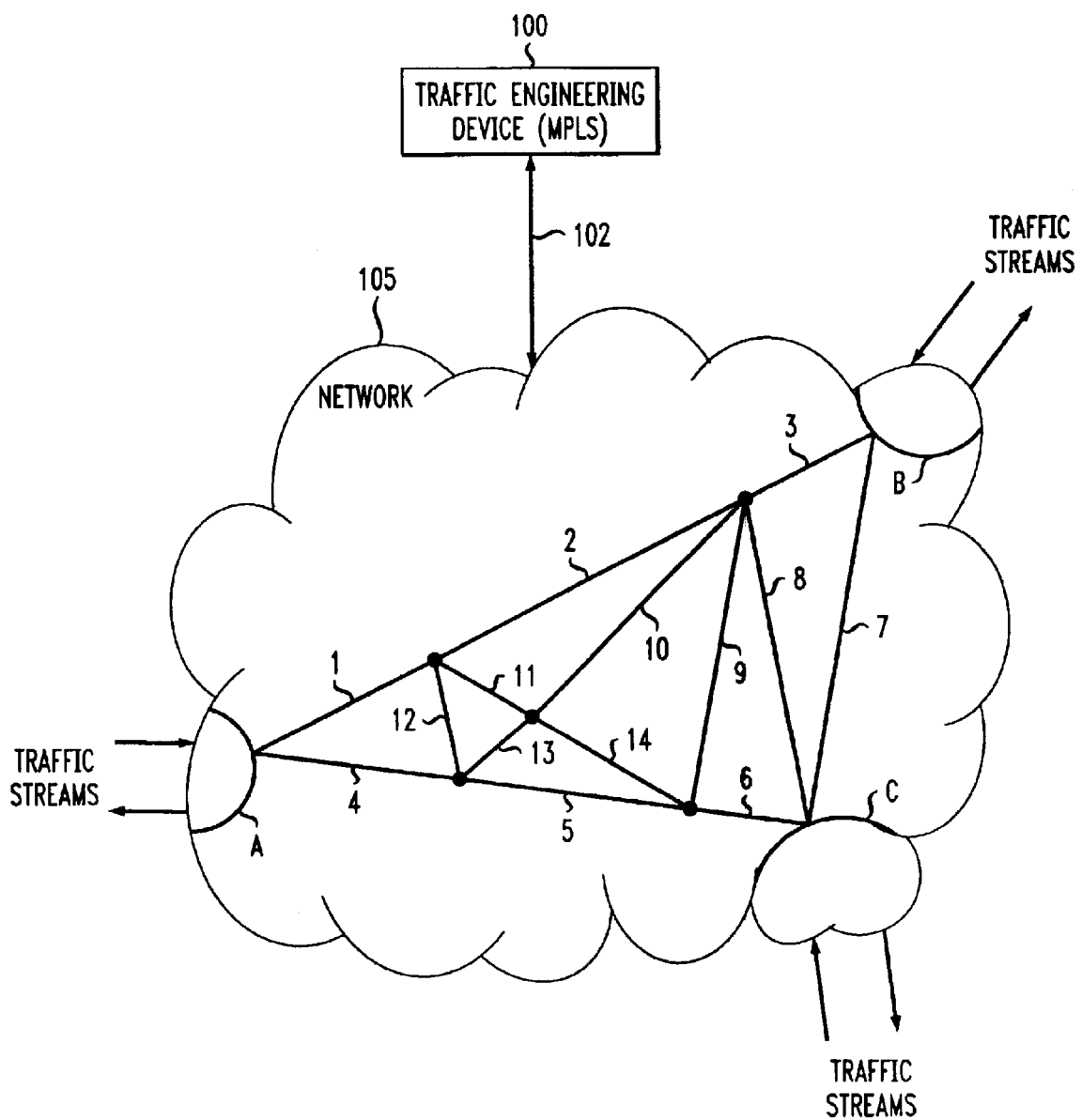
FIG. 2 is a diagram illustrating exemplary primary LSP and alternate LSP paths in a communications network using an exemplary embodiment of a Multiprotocol Label Switching (MPLS) system.

FIG. 2 illustrates a simple exemplary network 105 using an exemplary embodiment of a Multiprotocol Label Switching traffic engineering device 100. In particular, if links are congested, the exemplary traffic engineering device will reroute traffic from the congested links to other less congested links along primary LSPs and alternate LSPs. As an example of primary and alternate LSPs assignment, for a possible congestion in link 13 of FIG. 1, Table 2 provides, for example, exemplary paths for traffic destined to router C from router A (i.e., traffic trunk A→C).

TABLE 2

| Egressing Router | Primary LSP(s) Paths from Originating Router A | Alternate LSP(s) Paths from Originating Router A |
|---|---|---|
| C | 1-11-14-6 | — 4-12-2-8 |

Simply speaking, determination of the primary and alternate LSPs is based, among other factors, as further discussed below, on evaluating in a sorted order the various traffic trunks in the network 105 and their respective traffic contributions to one or more congested links. Accordingly, as these contributing traffic trunks—sorted in order of greatest to least traffic contributions—to the one or more congested links—are computationally removed from the network, it is apparent that the congested links will experience a reduction in their traffic flow. Correspondingly, the formerly congested links may continue to provide traffic paths, but at non-congested levels. Therein, "off-loaded" traffic is rerouted through other one or more primary and alternate paths in a manner conscious of minimizing LSPs, providing efficient "loading" of the paths, providing secondary congestion/failure paths in the form of alternate LSPs, etc. These and other advantages of this invention are described below.

As illustrated in FIG. 2, the traffic engineering device 100 is connected to a network 105 via a bi-directional link 102. The network 105 can be one or more networks containing typical network resources such as routers, traffic trunks, links, packet and switch based networks, servers, terminals, traffic nodes, etc. (all not shown). Each network resource in the network 105 is capable of transmitting or receiving data from each other network resource in the network 105, and may possess additional network or non-network related capabilities, as desired. The network 105 may be connected to other external devices, systems, or networks (not shown) and facilitates traffic via traffic routers A, B, and C, for example. Thus, the network 105 can be any system containing communications capabilities between two or more devices or systems. The network 105 can operate as a digital or analog communication system, in packet or switched mode, wireless or wired, and can facilitate communication between any known or yet known device capable of communicating information or the like to any other device connected to the network 105. Traffic streams, external to the network 105, enter or exit the network 105 via traffic routers A, B, and C. Since the network 105 contains various internal links, for example, 1–13, between each of the various traffic routers A, B, and C, the traffic engineering device 100, by determining the paths taken by traffic within the network 105, can control the traffic flow between the ingressing and egressing portions of the traffic—i.e., routers A, B, and C.

As discussed above, traffic trunks are typically characterized by ingress routers that control the traffic streams as they enter a network and egress routers that control the traffic streams as they exit a network. It is further appreciated that the traffic streams from the traffic trunks may traverse various network resources such as links, servers, other traffic trunks, communication-related or non-communication-related devices, etc. Since traffic streams can be characterized by traffic trunks, it is apparent that traffic trunks may traverse several tens, hundreds, thousands or more paths that are interconnected or independent of each other. Therefore, each path or network resource internal to an exemplary MPLS-controlled network 105 that is connected by a traffic trunk may be controlled by the traffic engineering device 100 to alter the paths of the constituent traffic flow.

Thus, it should be apparent that congested links in the network 105 that are traversed by traffic data of a traffic trunk can be "uncongested" by appropriately controlling the trunk(s) to reroute traffic away from the congested links. It should be further appreciated that while the exemplary embodiments of this invention describe systems and methods that control traffic trunks, it is apparent that the exemplary embodiments of this invention may be applied to trafficking devices other than those listed above that provide similar or related capabilities to traffic control.

Communication paths within the network 105 can occasionally become congested or fail. Upon such events, the network 105 can quickly initiate a recovery by establishing new internal communication paths within the network 105. The restoration process starts as the traffic engineering device 100 detects a problem using well known fault detection devices (not shown). Upon detection of a problem, the traffic engineering device 100 reroutes communication from the congested or failed internal communication path to one or more new communication paths within the network 105—as illustrated, for example, in Table 2—thereby maintaining proper traffic flow. The re-routing of the communication method is initiated or controlled by the traffic engineering device 100 connected to the network 105 via communication/control link 102.

It should be appreciated that while FIG. 2 illustrates routers A, B, and C, as concerning traffic streams entering/exiting the network 105, as stated above, other traffic trunks (not shown) interior to the network 105 may control traffic streams inside the network 105. Further, the traffic streams egressing or ingressing the network 105 or interior traffic streams within the network 105 may connect to one or more such networks, such as other MPLS-controlled networks, the Internet, a telephone network (e.g., local and/or long distance), or other wired or wireless networks, for example.

Figure 3:
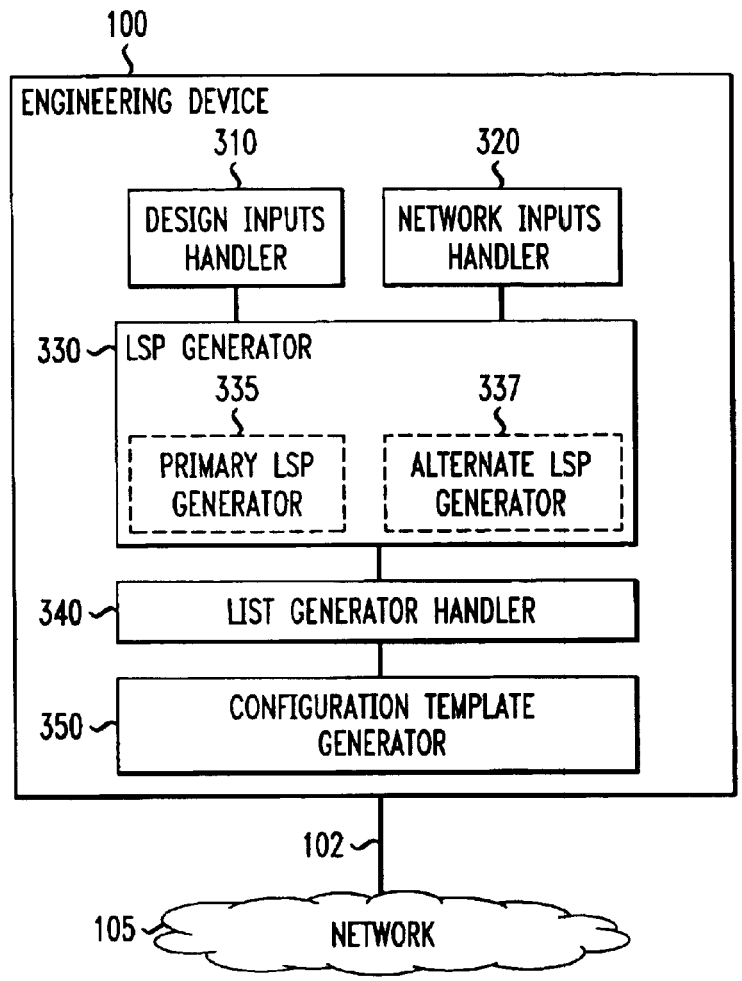
FIG. 3 is a block diagram illustrating an exemplary MPLS system.

FIG. 3 is a block diagram illustrating exemplary elements of an exemplary traffic engineering device 100, implementing an MPLS technology. The exemplary traffic engineering device 100 contains a design inputs handler 310, a network inputs handler 320, a LSP generator 330, a list generator handler 340, and a configuration template generator 350 connected to a network 105 via link 102. The design inputs handler 310 contains MPLS system design parameters and processes these parameters for use in generating MPLS path routing commands or information for subsequent handling. For example, design inputs handler 310 contains a parameter, $UN_{max}$, which is the maximum targeted utilization, under normal conditions, designated for every link in the network 105. In the context of this invention, $UN_{max}$ is defined as a fixed network parameter having the relationship $UN_{max} \cong$ (volume of traffic in link)/(speed of link). Other design parameters—such as, for example, the maximum targeted utilization under a single failure ($UF_{max}$), the maximum number of multiple primary LSPs ($Max_{prim}$), and the maximum number of multiple alternate LSPs ($Max_{Alt}$)—may also be contained in the design inputs handler 310.

The network inputs handler 320 operates similarly to the design inputs handler 310; however, the network inputs handler 320 contains network-related information, such as, for example, the network topology, routing protocol weight assignments, link bandwidth, traffic controls, traffic matrix, etc. It is appreciated that one of ordinary skill may modify the design inputs handler 310 and the network inputs handler 320 to contain less or more parameters, design/network or non-design/network related, as desired, without departing from the spirit and scope of this invention. Further, it is apparent that any of the parameters in the design inputs handler 310 and the network inputs handler 320 may be periodically updated or changed by a user or external control or by internal machinations.

Both the design inputs handler 310 and network inputs handler 320 information, parameters and functions are evaluated by the LSP generator 330. The LSP generator 330 contains a primary LSP generator 335 and an alternate LSP generator 337. The primary LSP generator 335 and alternate LSP generator 337 evaluate the information, functions, parameters found in the design inputs handler 310 and network inputs handler 320 and initiate primary LSP and alternate LSP generation. It should be appreciated that the primary LSP generator 335 and the alternate LSP generator 337 may operate independently of each other or operate asynchronously or in parallel, as desired. The functions of the primary and alternate LSP generators are discussed in greater detail below.

List generator handler 340 generates a list of traffic trunks and their associated links for assignment to the LSPs generated in LSP generator 330. The configuration template generator 350 builds or prepares for building the appropriate circuit connections for the LSPs using the designated traffic trunks provided in the list generator handler 340.

In various exemplary embodiments, the traffic engineering device 100 implements MPLS technology to distribute network traffic in a manner to reduce network congestion. Implementation of the MPLS technology permits data flow to be split over multiple primary LSPs with traffic distribution specified for each LSP. In addition, data flow can be rerouted to multiple alternate LSPs with traffic distribution specified for each alternate LSP when its primary LSP fails.

It should be appreciated that while FIG. 3 illustrates an exemplary embodiment of the traffic engineering device 100 containing the above distinct elements, one of ordinary skill may suitably combine or further distinguish the elements, as desired. For example, the network inputs handler 320 may be further subdivided into several elements pertaining to different aspects of the network 102 or any system connected to the traffic engineering device 100, without departing from the spirit or scope of this invention. Similarly, the configuration template generator 350 may be considered a separate device from the traffic engineering device 100, e.g., a part of the network 105. It should be appreciated that fault or congestion detection devices or systems may be integrated into the traffic engineering system 100 or, alternatively, integrated into the network 105, as desired. These fault or congestion detection devices or systems would report to the traffic engineering device 100 the current or prior state of traffic flow within the network 105. The reporting cycles may be periodic or continuous and may coordinate initiation of the MPLS technology. These and other modifications to the exemplary traffic engineering system 100 are apparent to those of ordinary skill in the art.

It should be appreciated that link 102 can be any known or later developed device or system for connecting the traffic engineering device 100 to the network 105. Such devices or systems may include direct serial/parallel cable connections, satellite links, wireless links, connections over a wide area network or a local area network, connections over an intranet, connections over the Internet or connections over any other distributed processing network or system. Additionally, the link 102 can be software devices linking various software systems. In general, the link 102 can be any known or later developed architecture or structure usable to connect the traffic engineering device 100 to the network 105.

Figure 4:
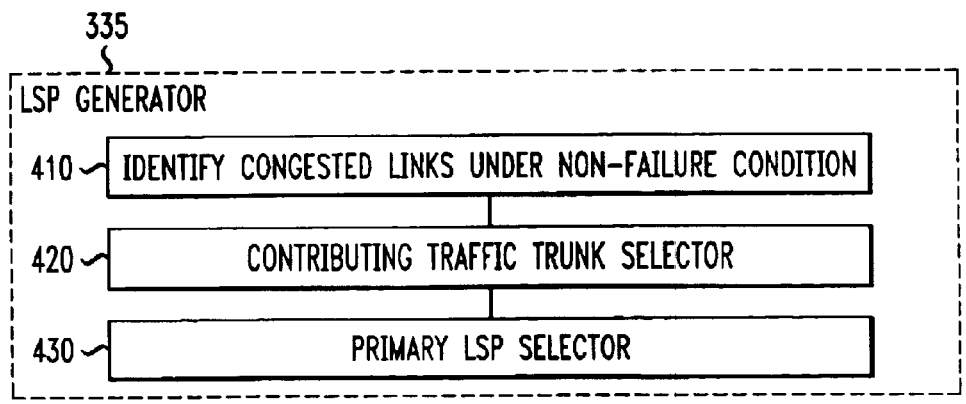
FIG. 4 is a block diagram illustrating an exemplary primary LSP generator.

FIG. 4 is a block diagram illustrating an exemplary process of a primary LSP generator 335 containing three connected modules for facilitating primary LSP configuration and trunk assignment. It should be appreciated that the three modules of FIG. 4, independently or corporately, receive and, if necessary, send information to and from the design inputs handler 310 and the network inputs handler 320 of FIG. 3. Similarly, the three modules can forward and receive information to and from the list generator 340 of FIG. 3.

The primary LSPs are generated to reduce congestion within links under an element non-failure condition. To this end, the first module 410 provides a list of links whose utilization is above the targeted maximum utilization $UN_{max}$, e.g., operating under a congestion status, for use in the successive module 420. The first module 410 provides this list to the second module 420 for further evaluation. An exemplary list of arbitrarily congested links, 12 and 7, with above target maximum utilizations is illustrated in Table 3.

TABLE 3

| Link ID and % of UNmax |
|---|
| Link 12 - 120% |
| Link 7 - 115% |

It should be appreciated that the list in the above Table 3 is solely provided for illustrative purposes; therefore, one of ordinary skill may alter the format or substance of the above list without departing from the spirit and scope of this invention.

The second module 420, using the above provided list of links under congestion, evaluates the list and provides a list of selected traffic trunks to which primary LSPs should be assigned. In this evaluation process, the second module 420 attempts to balance the total traffic volume to be routed through the primary LSPs while trying to minimize the maximum number of traffic trunks, with congested links, that should be routed through the primary LSPs. The second module 420 provides the list of identified traffic trunks to the third module 430 for further evaluation and assignment. An exemplary ordered list of arbitrary traffic trunks K–P contributing to the congestion of arbitrary links 12 and 7 is illustrated in Table 4.

TABLE 4

| Link ID and % of UNmax | Contributing Trunks' Congestion (%) |
|---|---|
| Link 12 - 120% | Trunk K - 75% |
|  | Trunk L - 30% |
|  | Trunk M - 15% |
| Link 7 - 115% | Trunk N - 90% |
|  | Trunk O - 20% |
|  | Trunk P - 5% |

The third module 430 assigns primary LSPs to each traffic trunk identified in the second module 420 while trying to minimize the maximum number of primary LSPs. The third module 430 implements an exemplary modified Djkstra algorithm to find LSPs with the largest residue capacities for each identified traffic trunk and outputs a list of primary LSPs for each traffic trunk, as well as the distributions of traffic over the primary paths.

Figure 5:
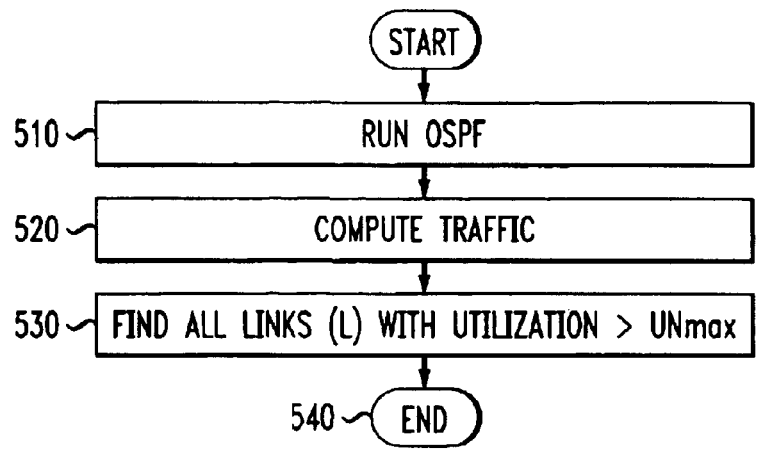
FIG. 5 is a flowchart of an exemplary congestion identifier process of the primary LSP generator of FIG. 4.

FIG. 5 is a flowchart outlining an exemplary congestion identifier process of the first module 410 of FIG. 4. The exemplary congestion identifier process provides a list of links whose utilization is above the design value $UN_{max}$ for evaluation by the second module 420 of FIG. 4.

The exemplary congestion identifier process is outlined as follows: In step 510 a querying of link capacities is initiated by running OSPF for each traffic trunk under evaluation in the network 105. The OSPF model is run under a non-failure mode and determines the shortest link traversing paths between each traffic trunk under evaluation in the network 105. From step 510, the process proceeds to step 520 where the total traffic load on each link is determined. In the above determination, consideration is not given to the bandwidth of each link. The process continues to step 530, where all links having a traffic load utilization above the targeted maximum utilization $UN_{max}$ are listed. For future reference, let L represent the total number of identified congested links. The process then ends in step 540, and the list of congested links is provided to the second module 420. It should be apparent that the exemplary congestion identifier process of the first module 410 may be periodically initiated or aperiodically initiated by a fault/congestion status received by the traffic engineering system 100, or by other mechanisms as desired.

It is appreciated that while the above exemplary process uses OSPF as a querying method, other routing schemes such as IS—IS or other Interior Gateway Protocols (IGP) may be used without departing from the spirit or scope of this invention.

Figure 6:
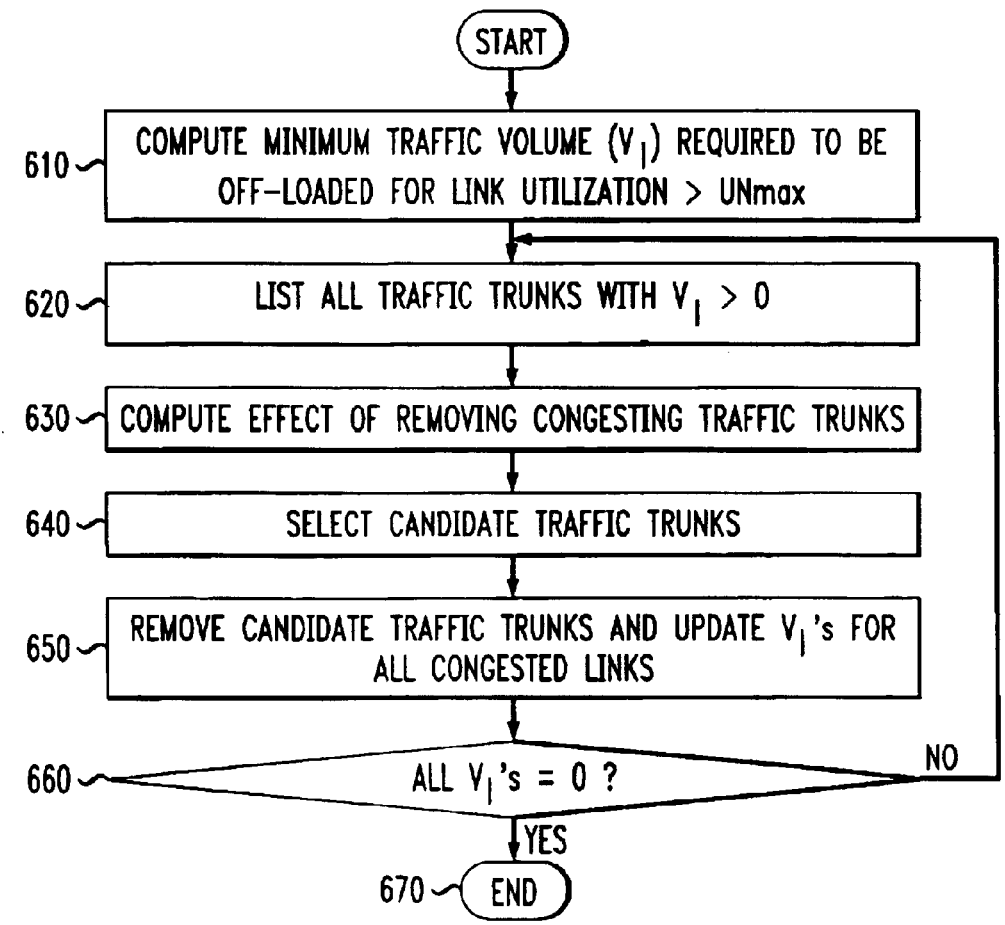
FIG. 6 is a flowchart of an exemplary contributing traffic trunk selector process of the primary LSP generator of FIG. 4.

FIG. 6 is a flowchart outlining an exemplary contributing traffic trunk identifier process of the second module 420 of FIG. 4. One function of the contributing traffic trunk identifier process is to produce a list of traffic trunks to which primary LSPs should be assigned. A goal in producing this list is to identify a minimum number of traffic trunks that should be routed through primary LSPs while trying to minimize the total traffic volume to be routed through the primary LSPs. It is appreciated that, since a traffic trunk can traverse multiple links, when a primary LSP is assigned for a traffic trunk, congestion of multiple links traversed by a traffic truck can, accordingly, be alleviated.

In step 610, for each identified congested link l, for l=1, . . . , L, a computation is performed to determine the minimum traffic volume ($V_l$) needed to be off-loaded, in order to reduce the link traffic load utilization below the maximum allowed utilization $UN_{max}$. The process continues to step 620 where all traffic trunks containing traffic that traverses the identified congested links, having a positive $V_l$, are identified. The process proceeds to step 630, where, for each identified traffic trunk containing traffic that traverses the identified congested link, a computation is performed to determine the potential reduction of $V_l$ if the congested links are removed. However, reductions that result in a $V_l$ that are below zero are not considered. The contributions of each traffic trunk's traffic to the congestion in each given link are summed up and denoted as $C_k$, where k represents the index of the trunk under evaluation.

The process then proceeds to step 640. In step 640, the traffic trunk with the largest value of $C_k$ is identified as an appropriate candidate traffic trunk for a primary LSP assignment. Where multiple such traffic trunks having the same value of $C_k$ are identified, the traffic trunk with the smallest traffic volume is selected as the appropriate candidate.

Next, in step 650, the identified or selected traffic trunk contributing the most to link congestion (in step 640) is removed from the list of candidate traffic trunks and the $V_l$ for all remaining congested links are updated to reflect the "eliminated" traffic. Next, in step 660, if the remaining congested links and their associated congestion-contributing traffic trunks have a $V_l$ above zero, the process jumps to step 620 and steps 620–650 are repeated until all the respective $V_l$'s are reduced to zero; otherwise the process goes to step 670 and ends. Once all the $V_l$'s of the identified traffic trunks are set to zero or to below zero, the process, based on the above "best" removed congestion-contributing trunks, produces or prepares a list of candidate traffic trunks for LSP assignment by the third module 430.

Figure 7:
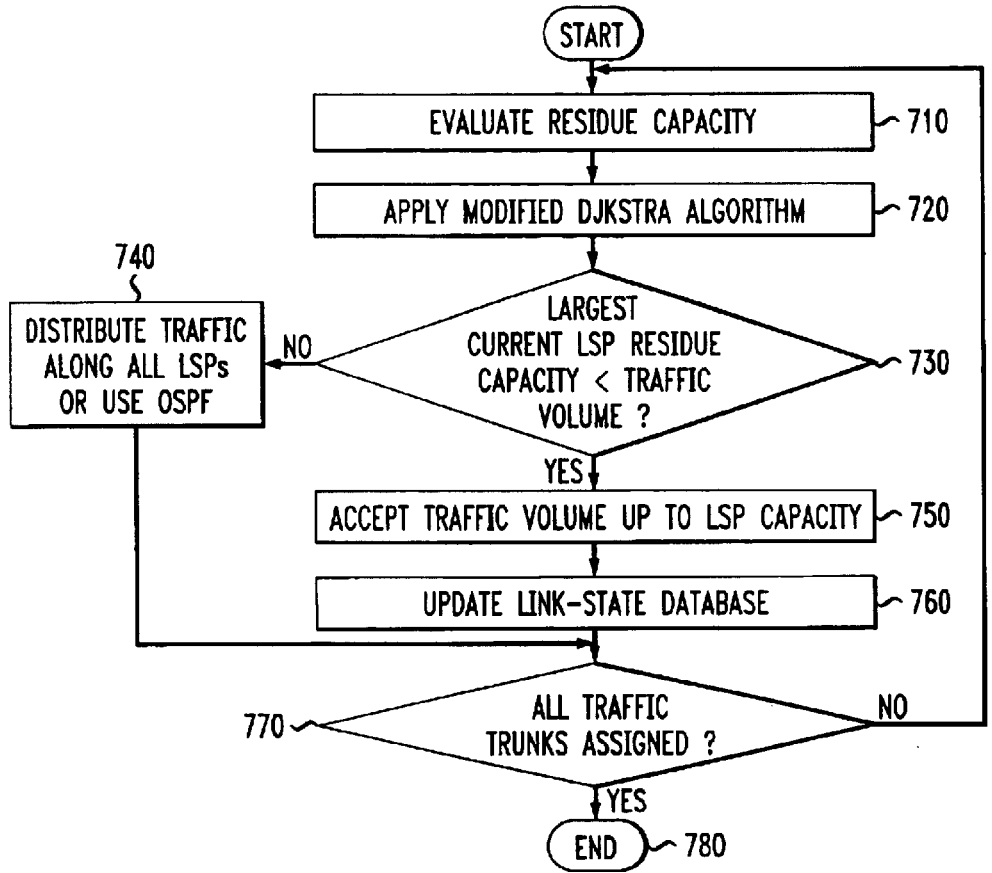
FIG. 7 is a flowchart of an exemplary primary LSP selector process of the primary LSP generator of FIG. 4.

FIG. 7 is a flowchart outlining an exemplary primary LSP selector process of the third module 430 of FIG. 4. One function of the exemplary primary LSP path selector process is to assign primary LSPs to each trunk compiled in the candidate traffic trunk selector process of FIG. 6. An objective of the generator of primary LSPs is to minimize the maximum number of primary LSPs. The maximum number of primary LSPs for a traffic trunk should not be more than $Max_{Prim}$, which is chosen as a design input provided in the design inputs handler 310, as discussed above. The primary LSP path selector process also outputs a list of primary LSPs and the corresponding assigned traffic trunks, as well as the corresponding traffic distribution profiles over the primary LSP paths.

The exemplary primary LSP selector process compiles, using traffic trunks identified in the candidate traffic trunks outlined in the exemplary process of FIG. 6, a link-state database for the network 105, in terms of the additional traffic capacity each link can support without violating the maximum allowed utilization $UN_{max}$. This additional traffic capacity can be referred to as the residual capacity of a respective link. The link-state database contains a list of directly connected links between every router and their residual capacities.

Beginning in step 710, the process evaluates the residual capacity of each link, starting from the largest traffic volume trunk in the traffic trunk identifier list, to be the smaller of either the value of the traffic volume or the value of the residue capacity of that link. Next, in step 720, a modified Djkstra algorithm is applied to each traffic trunk, as further discussed below, to find paths that constitute a LSP with the largest residue capacity for the traffic trunk. Next, after determining the LSP with the largest residue capacity, step 730 examines the current LSP with the largest residue capacity to see if the LSP's residue capacity is smaller than the volume of the traffic trunk being evaluated. If the LSP's residue capacity is smaller, then the process proceeds to step 750 where the LSP is assigned with as much traffic volume up to the LSP's residue capacity. In this event, the process proceeds to step 750 where the link-state database is updated to reflect the above traffic trunk-to-LSP assignment. The process then reexamines the link-state database to find the next set of paths that constitute a LSP with the next largest residue capacity for the remaining unassigned traffic. If the next largest residue capacity LSP can handle the remaining traffic, then the LSP is assigned and, accordingly, the link-state database is similarly updated to reflect the new assignment. This process is repeated until all the remaining traffic can be assigned or, if the maximum number of LSPs ($Max_{prim}$) has been reached, the process proceeds to step 740, as discussed below. If all the remaining traffic is assigned, then the process continues to step 770.

If it is determined that the modified Djkstra algorithm cannot find a set of paths to generate a LSP with sufficient residue capacity to handle the remaining traffic or, alternatively, the maximum number of LSPs ($Max_{prim}$) has been reached, then the process proceeds to step 740 where either the remaining traffic is distributed among the existing LSP(s) so that the existing link capacity utilization of all existing LSPs' congestion profile is at the same level or the process uses OSPF routing, or any other appropriate routing scheme, for assigning the remaining traffic. In either event, after completion of step 740, the process continues to step 770.

In step 770, the link-state database list is tested to determine if all the trunks on the database list have been assigned. If all the trunks on the database list are not assigned, then the process jumps to step 710 and steps 710–770 are repeated until the above conditions are satisfied. Once all the traffic has been assigned, then the process proceeds to step 780 and is stopped.

In various exemplary embodiments, an exemplary modified Djkstra algorithm is applied to the parameters of the identified traffic trunks (to be removed) to find traffic trunks with the largest residue capacity and, correspondingly, to designate paths (LSP) suitable for rerouting the removed traffic trunks. The following is a discussion of the exemplary modified Djkstra algorithm.

The modified Djkstra algorithm creates, for example, two sets of node sets: (1) PATH, where PATH is the set of nodes for which the best path from the computing ingress node has been found; and (2) TENT, where TENT is the set of nodes which are not in the set of PATH but are direct neighbors of nodes in PATH. Initially, these two sets can be empty sets. A vector (nodeID, a, b, c) can be used to represent a node in the node sets PATH and TENT, where the first argument, "nodeID", is the node ID of the current node. The second argument, "a", is the maximum modified residual capacity from the computing ingress node to the current node. The third argument, "b", is the parent node that is in the PATH node set and directly connects to the current node. The last argument, "c", is the link between the parent node and the current node.

The node set TENT is an ordered set in a descending order of the second argument, a. The exemplary process for creating the two sets of nodes, PATH and TENT, during the modified Djkstra algorithm is comprised of five steps, as discussed below:

In step one, each link in the network is assigned a modified residual capacity by taking the minimum of the residual capacity of that link and the amount of traffic trunk to be routed. In step two, the process starts with the ingress node of the traffic trunk as the root tree for computing. This is accomplished by inserting a (myID, ∞, 0, 0) vector in PATH.

Next, in step three, for the node N, having a corresponding vector (N, a(N), b(N), c(N)), in PATH, find node N's neighbor, M, that is not in the node set PATH. For each arbitrary link l, from N to M, define a vector (M, a(M),N, l) where a(M) is equal to the minimum of the maximum modified residue capacity a(N) and the modified residue capacity of link l. Next, place vector (M, a(M), N, l) into the node set TENT where its placement, based on the descending order of the second argument, a, is behind all vectors in TENT having a same value of a. This process is performed for all neighbors, M, of N which are not in the node set PATH.

Next in step four, the lead vector is removed from TENT. If the lead vector in TENT is the egress node of the traffic trunk, then it should be apparent that there are no other potentially bottlenecking links between the node N and the egressing node of the traffic trunk. Consequently, the algorithm continues onto step five to construct a LSP for the traffic trunk. Otherwise, the module updates PATH to include this TENT node and removes all vectors in TENT with the same node id as this TENT node, and then jumps back to step three, where steps three to four are repeated until the head vector in TENT becomes the egress node of the trunk.

Next, in step five, the algorithm constructs the primary LSP from the egress node of the traffic trunk to the ingress node based on the parent nodes and the connecting link arguments. The algorithm may then initiate construction of the primary LSPs using a configuration template generator 350 to facilitate command and control of the network resources to coordinate the primary LSP link, trunk, and network resource assignments. It should be apparent from the above discussion that multiple primary LSPs may be developed for traffic management.

It should be appreciated that while the exemplary modified Djkstra algorithm contains five distinct steps, it is apparent that one of ordinary skill may modify the exemplary modified Djkstra algorithm to provide additional or lesser steps in evaluating a LSP residue capacity without departing from the spirit and scope of this invention. Further, the exemplary modified Djkstra algorithm may construct the LSPs using more relaxed or more stringent, or other desired, conditions without departing from the spirit and scope of this invention. It should also be appreciated that the exemplary modified Djkstra algorithm may be readily implemented in software that can be used in a variety of hardware systems.

Figure 8:
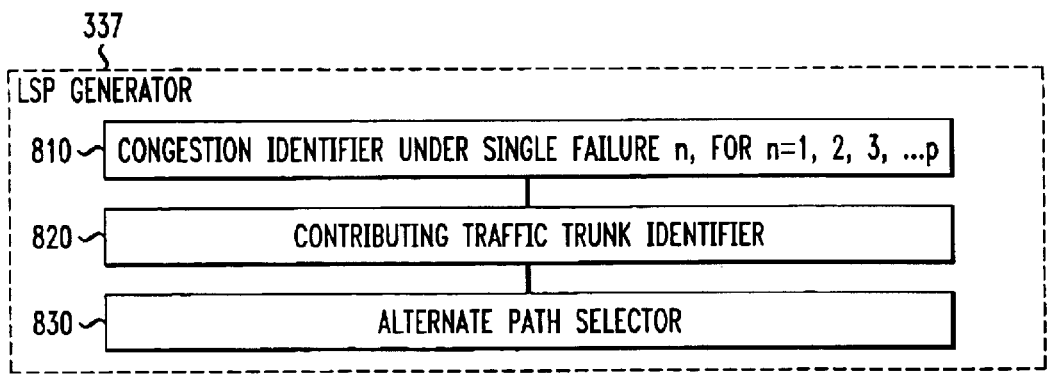
FIG. 8 is a block diagram illustrating an exemplary alternate LSP generator.

FIG. 8 is a block diagram illustrating an exemplary alternate LSP generator 337. The exemplary alternate LSP generator 337 contains three connected modules for facilitating alternate LSP configuration and trunk assignment. The alternate LSPs operate to reroute network traffic in the event of a single network element failure or congestion event in the primary LSP. The methodology of alternate LSP generation can be summarized as follows: For each simulated single element failure anywhere in the network, a standard failure rerouting mechanism is initiated (e.g., OSPF). Links that become congested because of the rerouting are identified and alternate LSPs are generated to reroute the traffic trunks away from the congested links. This process is recursively applied one failure at a time to all network elements. It should be apparent that the alternate LSP is not applied to a congested link that is "outside" a primary LSP.

The first module 810 of an exemplary alternate LSP generator 337 of FIG. 3 identifies congested links arising from a failure event rerouting and outputs a list of links whose utilization is above a targeted maximum utilization $UF_{max}$. The second module 820 evaluates the congestion caused by the non-original traffic (traffic routed around the failed network element) and selects the minimum number of non-original traffic trunks that should be rerouted through alternate LSPs while at the same time trying to minimize the total non-original traffic volume to be rerouted through the alternate LSPs. The second module 820 generates a candidate trunk list similar in effect to the second module 420 of FIG. 4, but with some differences, as discussed below.

The third module 830 assigns alternate LSPs to each traffic trunk selected from the trunk list provided in the above second module 820. The third module 830 attempts to minimize the number of alternate LSPs generated and generates the alternate LSP to trunk list.

The alternate LSP provides protection to any single network element failure on its associated primary path. Hence, it is desirable that a primary LSP and its alternate LSP are disjointed to provide a reasonable degree of independence. If the primary LSP and alternate LSP are disjointed, then any single failure not along a primary path will not disconnect the primary path. However, it is possible that, in the design and implementation of alternate LSPs and primary LSPs, multiple alternate LSPs of the same primary LSP can have overlapping paths. Because a traffic trunk can traverse multiple links, congestion in a trunk can contribute to the congestion of more than one link at a time. It should be apparent, then, that when alternate LSPs are assigned for a traffic trunk, congestion on multiple links can ensuingly be mitigated.

It is appreciated that, in this discussion, for congested links within an identified trunk, there will be two segments of traffic traversing the link. One segment is the original traffic that existed before a failure and the other segment is the rerouted traffic to the link from other parts of the network as a result of the considered single failure. For the basis of the following discussion, this second segment is referred to as a non-original traffic or, alternatively, non-original traffic trunks.

Figure 9:
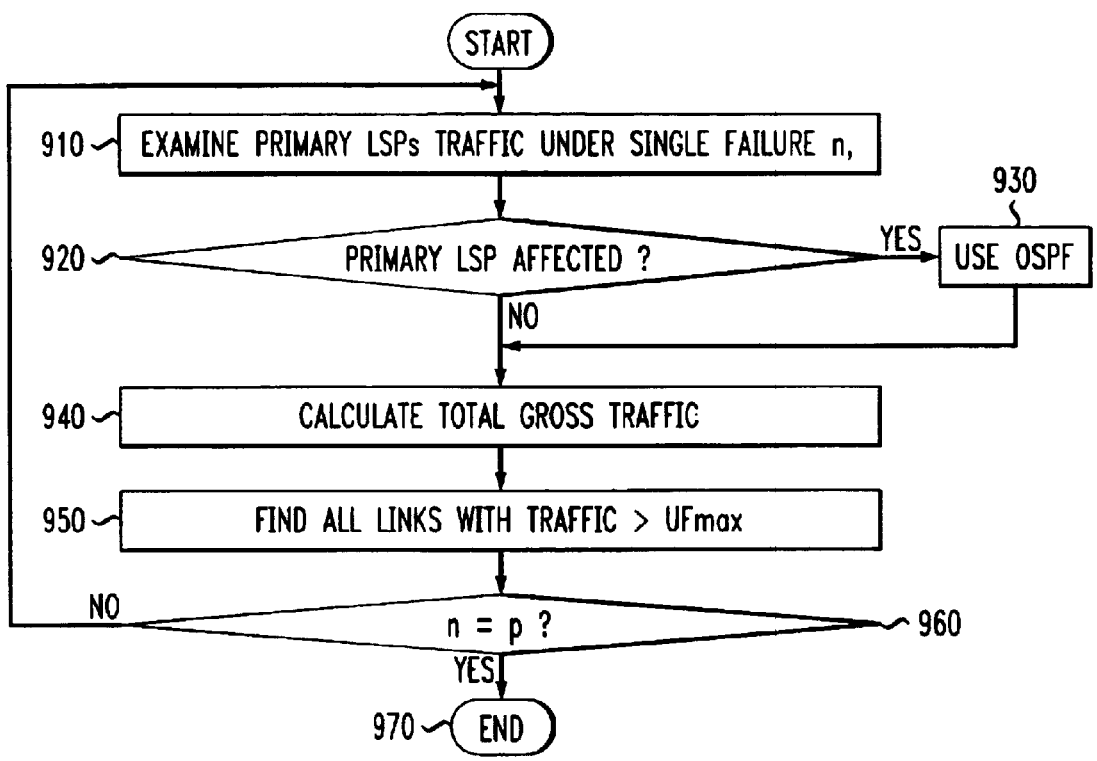
FIG. 9 is a flowchart of an exemplary congestion identifier process of the alternate LSP generator of FIG. 8.

FIG. 9 is a flowchart outlining an exemplary congestion identifier process of the first module 810 of FIG. 8. The congestion identifier process provides a list of identified links whose utilization is above a targeted maximum UFmax under a "considered" failure or congestion of a primary LSP.

The process begins with step 910 where the network residue capacity for a simulated single failure case n=1, 2, . . . p, is evaluated, where p is an arbitrary maximum number of single failure episodes permitted. This value of p may be provided by the design inputs handler 310 or internally provided. The process 910 begins its evaluation by using a simulated single failure case n=1 and proceeds to step 920.

In step 920, all traffic trunks routed by primary LSPs under non-failure conditions are examined to see if the primary LSPs are not affected by failure n. If no primary LSP traffic flows are affected, then the process continues to use the primary LSPs to route the traffic and the process proceeds to step 940. However, if any of the primary LSP are affected by the simulated single failure case n, then the process jumps to step 930 where OSPF is used to reroute the traffic trunks. For all other traffic trunks, OSPF for routing or rerouting may be used. In this event, the process proceeds to step 940.

Next, in step 940, the process calculates the total gross traffic load on each link of the residual network without considering the bandwidth of the link. The process proceeds to step 950 where the process searches and finds all links whose traffic load utilization is above the targeted allowed maximum utilization $UF_{max}$ for a failure condition n. Step 950 compiles this list for use in the second module 820. For reference purposes, let L(n) denote the total number of congested links identified for a failure n. The process continues to step 960.

In step 960, the process tests the index of the single failure case n to see if n equals p, the maximum failure episode index. If n is not equal to p, then the process jumps to step 910, increments the failure case index by one, and repeats steps 910–960. Steps 910–960 are repeated until step 960 determines that n equals p; then the process continues on to step 970 and ends.

Figure 10:
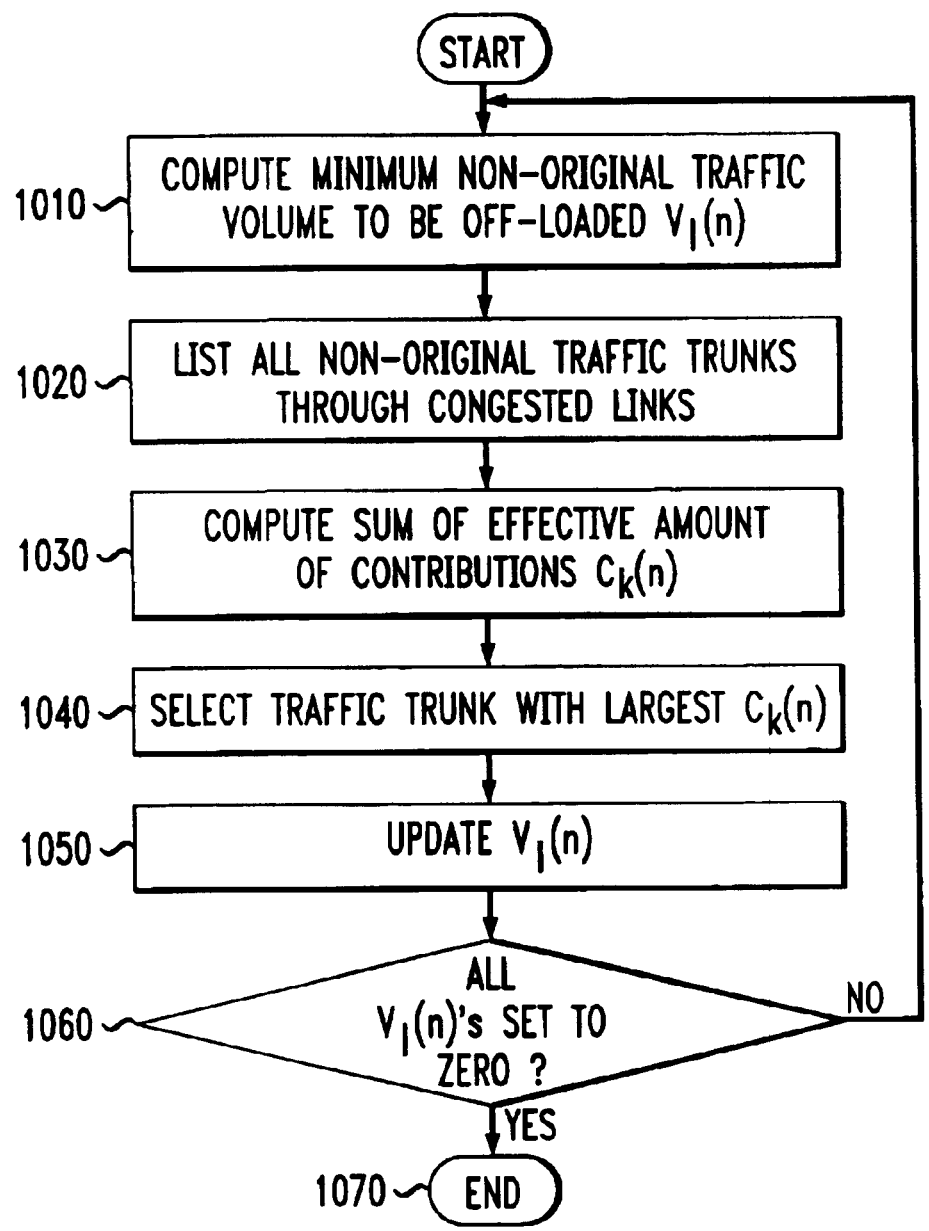
FIG. 10 is a flowchart of an exemplary contributing traffic trunk selector process of the alternate LSP generator of FIG. 8.

FIG. 10 is a flowchart outlining an exemplary contributing traffic trunk identifier process of the second module 820. The exemplary contributing traffic trunk identifier process attempts to regulate the congestion caused by non-original traffic trunks. Specifically, the exemplary contributing traffic trunk identifier process attempts to minimize the number of non-original traffic trunks and the total non-original traffic trunk volume to be rerouted through alternate LSPs.

The process begins in step 1010 where for an identified congested link l where l=1, . . . , L(n), and n=1, 2, . . . p, the system determines the minimum non-original traffic volume that should be off-loaded to bring the link utilization below the maximum allowed utilization $UF_{max}$. Let $V_l(n)$ denote this number. The value $V_l(n)$ can be the sum of all the non-original traffic trunks if the utilization of original traffic trunks is already larger than $UF_{max}$. The process proceeds to step 1020 where, for a single failure n=1, 2, . . . p, all non-original traffic trunks traversing through the identified congested links are listed. The process continues to step 1030.

In step 1030, for a single failure n=1, 2, . . . p, for each traffic trunk listed from step 1030, the process computes the effective reduction of the value of $V_l(n)$ if the contributions of each congested link is removed from the traffic trunk. In this computation, the amount that $V_l(n)$ is brought down below zero is not counted. The process then sums up the contributions by the traffic trunk under evaluation for all congested links. This sum is denoted by $C_k(n)$ where traffic trunk k is the trunk under evaluation.

Next, step 1040 selects the traffic trunk with the largest $C_k(n)$ value among all k's and all n's as the candidate traffic trunk for alternate LSP assignment. If there are multiple such traffic trunks, the process selects the one with the smallest traffic volume of the entire set of evaluated traffic trunks.

Next, in step 1050, the traffic trunk selected in step 1040 is removed in all the single failure cases. The process then updates $V_l(n)$ for all congested links, l=1, 2, . . . p. Next, the process proceeds to step 1060 where the $V_l(n)$ values are tested to determine if they are all negligible or equal to zero. If all the $V_l(n)$'s are not negligible or equal to zero, then the process jumps to step 1020 and steps 1020–1060 are repeated for the non-removed remaining traffic trunks until the $V_l(n)$ values are negligible or equal to zero. In this event, the process proceeds to step 1070 and ends.

The exemplary alternate LSP selector process of the third module 830 assigns alternate LSPs to each traffic trunk selected from the results of the exemplary contributing traffic trunk identifier process of module 820.

In this process, it is desired that the number of alternate LSPs is minimized. However, the maximum number of alternate LSPs for a given traffic trunk should not be more than $Max_{Alt}$ which is provided as a design input. The exemplary alternate LSP selector process provides lists of alternate LSPs for each traffic trunk and distribution profiles of the traffic over the alternate paths. For example, with all identified traffic trunks removed for a single failure n, the process computes a link-state database for the network in terms of the additional traffic each link can support as constrained by a maximum allowed utilization $UF_{max}$. This traffic is referred to as the residual capacity of a link for failure n. The process generates a link-state database containing a list of connected links to every router and their residual capacities for all single failure cases n.

The alternate LSP selector process comprises at least three steps as follows: In step one, the process searches for alternate paths with residual capacities that are not in the primary LSP. This is accomplished by finding the traffic trunk with the largest traffic volume from the V(l) list identified in the second module 820. Let t be the traffic trunk with the largest traffic volume from the V(l) list and F be the set of all single failures in which the failure link is on the primary path of the traffic trunk t. Let T(t) represent the traffic volume of traffic trunk t. Let the modified residual capacity of a link k, MRes(k), be defined as follows: MRes(k)=min{T(t), min{residue capacity of link k during failure n, n∈F}}. It is apparent that the modified residue capacity for a link k in a primary LSP experiencing a primary path element failure will be zero. Accordingly, presuming only paths with MRes(k)>0 are used, it is assured that alternate paths will not contain links in the primary path. Given these expressions, the modified Djkstra algorithm, discussed above, is applied to find a LSP with the largest residual capacity for the traffic trunk under evaluation.

In step two, from application of the modified Djkstra algorithm, if the residual capacity of the identified LSP is smaller than the volume of the traffic trunk, the LSP's traffic volume is set to the LSP's residual capacity. The modified residual capacities of the link-state database is updated. Next, the next largest residual capacity LSP is found based on the updated database. If all of the remaining traffic can be carried by the largest residual capacity LSP, then the residual capacities of the link-state database for all failure cases in the set F are updated and the next largest traffic trunk on the list is, in turn, evaluated.

However, in the above step, if the modified Djkstra algorithm cannot find a LSP with positive residual capacity for the remaining traffic trunk or the maximum number of LSPs has been reached prior to alternate LSP assignment, then no alternate LSP for this traffic trunk is assigned. In this event, OSPF rerouting for this traffic trunk for all single failure cases is used, as similarly implemented above in the exemplary primary LSP selector process of the third module 430 of FIG. 4.

Next, steps one and two are repeated until either all identified traffic trunks on the link-state database list have been assigned to alternate LSPs or the maximum number of alternate LSPs have been reached. In this event, the process may proceed to generate alternate LSP assignments via the template generator 370, which contains systems and methods to facilitate command and control of the network resources to coordinate the alternate LSP link, trunk, and network resource assignments.

Figure 11:
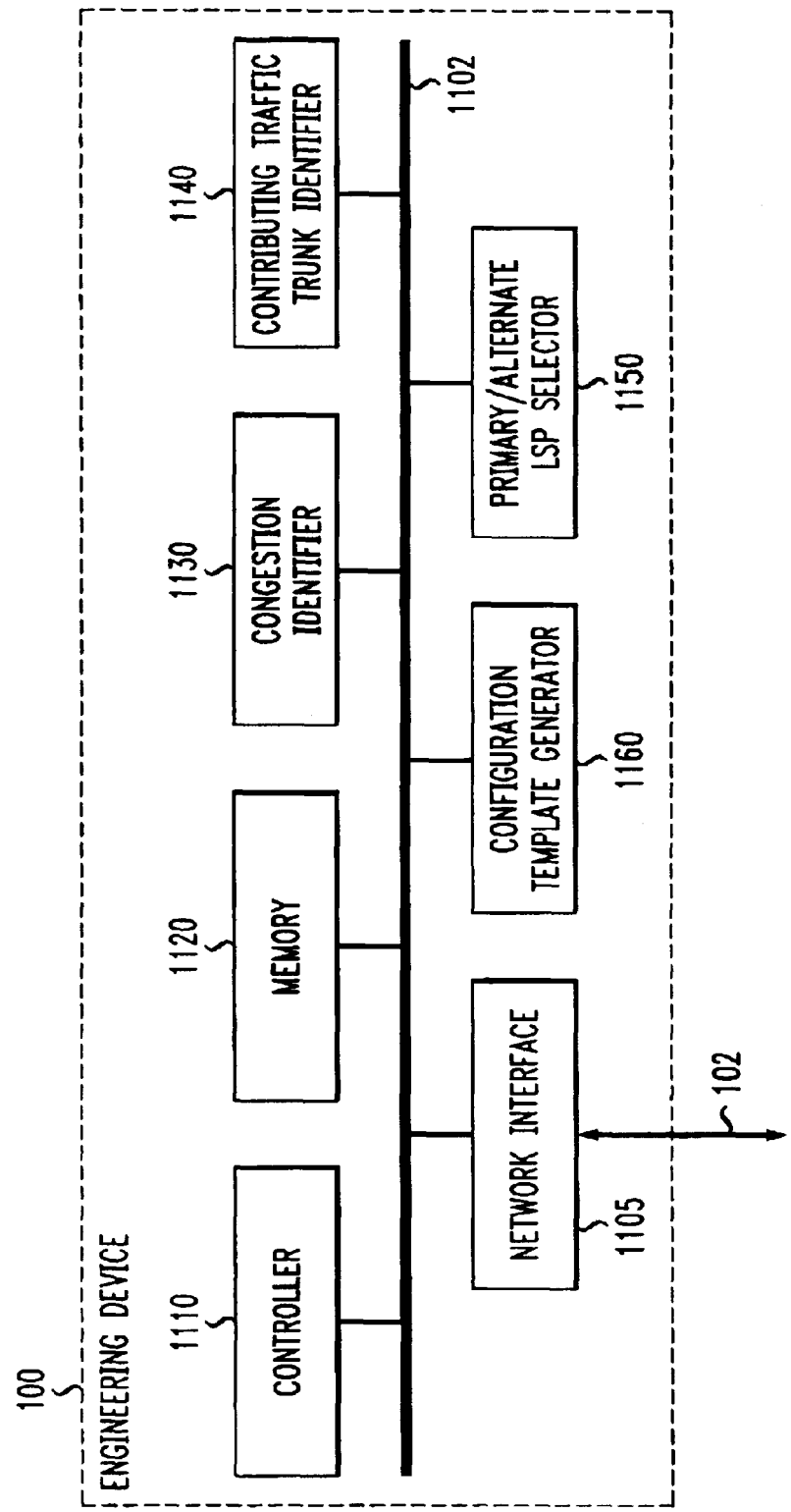
FIG. 11 is a block diagram illustrating an exemplary network traffic engineering device capable of implementing an exemplary MPLS system.

FIG. 11 is a block diagram illustrating an exemplary network traffic engineering device 100. The exemplary traffic engineering device 100 may contain a controller 1110, a memory 1120, congestion identifier 1130, a contributing traffic trunk identifier 1140, a primary/alternate LSP selector 1150, a configuration template generator 1160, and a network interface 1105. The above components may be coupled together via a signal bus 1102.

The controller 1110 operates to coordinate, individually or in the aggregate, other devices, shown or not shown, connected to the bus 1102. The bus 1102 may be any form of a communication bus, wired or wireless. It should be appreciated that the exemplary traffic engineering device 100 may be implemented by one or more general or special purpose computers, programmed microprocessors or microcontrollers and peripheral integrated circuit elements, ASICS or other logic circuits such as discrete element circuits, programmable logic devices such as PLD, PLA, FPGA or the like. In general, any finite state machine that is capable of implementing the processes of FIGS. 2–10 can be used to implement the exemplary traffic engineering device 100 according to this invention. Also, while FIG. 11 illustrates a bus architecture, any architecture may be used as is well known to one of ordinary skill.

While the memory 1120 is illustrated in FIG. 11 as being separate from the controller 1010, it is apparent to one of ordinary skill that the memory 1120 could be incorporated into the controller 1110 to form a single device—for example, on-chip RAM—without departing from the spirit or scope of this invention. Similarly, each of the devices in the exemplary traffic engineering device 100 may contain its own individual memory or controller.

The congestion identifier 1130, via information provided by the controller 1110 and memory 1120, outputs a list of links whose utilization is above a targeted maximum utilization $UN_{max}$. The contributing traffic trunk identifier 1140 outputs a list of traffic trunks to which primary LSPs should be assigned. The primary/alternate LSP selector 1150 evaluates the identified traffic trunks and assigns selected traffic trunks to primary/alternate LSPs. The configuration template generator 1160 generates command and control signals through the network interface 1105 to build or prepare for building the appropriate connections for facilitating rerouting of the network's paths in accordance with the primary/alternate assignments.

The network interface 1105 acts as an input/output interface between the exemplary traffic engineering device 100 and the network 105. Communication between the network 105 and the exemplary traffic engineering device 100 is provided through a communications/data bus 102.

It should be appreciated that while FIG. 11 illustrates various distinct and separate elements of the exemplary traffic engineering device 100, it is apparent that one of ordinary skill may suitably combine or further distinguish the various elements of exemplary traffic engineering device 100 without departing from the spirit and scope of the invention.

It is appreciated that while the invention is not specifically described in connection with an Internet protocol (IP) network, providers of Internet services will be able to apply the capabilities of Multiprotocol Label Switching technology for traffic engineering and failure protection/restoration of an IP network. Moreover, it should be appreciated that the invention can be used with many other types of communication systems, including wired and wireless communication systems, computer, cable, satellite, corporate or other similar networks that deal with traffic engineering concerns.

While the invention has been described in conjunction with specific embodiments thereof, it is evident that many alternatives, modifications and variations will be apparent to those skilled in the art. For example, routing methods other than OSPF may be used in determining the traffic profiles, such as IS—IS or IGP, etc. Accordingly, preferred embodiments of the invention as set forth herein are intended to be illustrative, not limiting. Various changes may be made without departing from the spirit and scope of the invention.

What is claimed is:

1. A method for routing traffic in a network comprised of a plurality of links to selectively off-load traffic from congested portions of the network to portions that are less congested, comprising:

identifying which of said links are congested determining, for each of said links, that a utilization for the link exceeds a predetermined parameter associated with the link, said predetermined parameter a maximum link utilization, the maximum link utilization associated with all of the links and associated with a bandwidth that is below a maximum capacity of the link;

identifying traffic trunks that contribute to traffic of the identified congested network links;

selecting rerouting traffic trunks where each of the rerouting traffic trunks are traffic trunks that contribute to the traffic of the identified congested network links;

ordering the rerouting traffic bunks in congestion contribution order; and rerouting portions of the traffic in the rerouting traffic trunks that contribute to the identified congested network links sufficient to reduce said link utilization to a value equal to or below said predetermined parameter.

2. The method of claim 1, wherein the predetermined parameter is a traffic load parameter, the selecting rerouting traffic trunks comprising:

generating a minimum traffic off-load volume Vl, for each of the identified congested network links l=1, 2, 3, . . . L, where L is the total number of congested network links, that brings a traffic load of network link l to below the traffic load parameter.

3. The method of claim 2, wherein the selected rerouting traffic trunk is selected from the identified traffic trunks, starting with a traffic trunk having a greatest volume of traffic contribution to the traffic of the corresponding congested network link.

4. The method of claim 2, further comprising:

a) generating a residue capacity for all the network links of the network after the traffic contribution of the selected rerouting traffic trunk is removed from the corresponding congested network link;

b) generating a modified residue capacity for all the network links based on the residue capacity and traffic contribution of the selected rerouting traffic trunk; and c) generating a label switching path (LSP) having an LSP residue capacity for the traffic portion of the selected rerouting traffic trunk.

5. The method of claim 4, further comprising:

d) adding the LSP of step c to route the traffic portion of the selected rerouting traffic trunk;

e) adding the LSP residue capacity as added traffic to the network;

f) generating a new residue capacity for all the network links based on the residue capacity and the added traffic;

g) generating another LSP having another LSP residue capacity for another traffic portion of the selected rerouting traffic trunk if the LSP residue capacity is less than the traffic portion of the selected rerouting traffic trunk;

h) repeating steps d–g until either new traffic of the identified congested traffic link is approximately less than or equal to the predetermined parameter, or until a predetermined maximum number of LSPs has been reached;

i) selecting a next traffic trunk from the list and removing a traffic portion contribution of the next traffic trunk that contributes to the corresponding identified congested network link from the network, if the maximum number of LSPs has not been reached; and j) repeating steps a–i until all traffic of the rerouting traffic trunks have been routed with LSPs or until the maximum number of LPSs has been reached.

6. The method as in claim 5, wherein the LSPs are selected in greatest residue capacity order, the method further comprising:

k) generating a Path node list and a Tent node list for building a path from an ingress node of the selected rerouting traffic trunk to an egressing node of the selected rerouting traffic trunk, wherein the Path comprises:

l) starting a first node set path from the ingress node of the selected ingressing rerouting traffic trunk;

m) finding all nearest neighbor nodes not in the first node set;

n) placing all nearest node neighbors in a second node set ordered based on their maximum modified residue capacity;

o) removing a lead node in the second node set;

p) updating the first node set with the lead node if the lead node is not an egressing node and deleting all nodes with a same node id as the lead node from the second node set;

q) repeating steps m–p until the lead node is an egressing node; and r) constructing a best path primary LSP from the nodes listed in the first node set.

7. A method for routing network traffic of a network, comprising:

generating, in the event of a single network link failure case n=1, 2, . . . k, where k is a number of all the links in the network, a plurality of link utilizations generated based on a first routing technique;

identifying one or more network links as congested by determining that, for each link, a utilization of the link exceeds, a predetermined parameter, wherein the predetermined parameter is a maximum link utilization, the maximum link utilization associated with all of the links and associated with a bandwidth that is below a maximum capacity of the link; and rerouting portions of the traffic that contribute to the identified congested links sufficient to reduce, for each of the congested links, the link utilization to a value equivalent to or below said predetermined parameter.

8. The method of claim 7, further comprising:

identifying traffic trunks that contribute to traffic of the identified congested network links; and selecting rerouting traffic trunks where each of the rerouting traffic trunks are traffic trunks that contribute to a non-original traffic of the identified single failure congested network links.

9. The method of claim 8, wherein the predetermined parameter is a traffic load parameter, the selecting rerouting traffic trunks comprising:

generating a minimum non-original traffic off-load volume Vl(n) for each of the identified congested network links l=1, 2, 3, . . . L, where L is the total number of congested network links, that brings the non-original traffic load of network link l to below the traffic load parameter;

generating a list of traffic trunks corresponding to each of the identified congested network links, where each of the traffic in the traffic trunks in the list contributes to the non-original traffic of a corresponding identified congested network link;

selecting a traffic trunk as a rerouting traffic trunk from the list based on its non-original traffic contribution to the traffic of the corresponding congested network; and rerouting a traffic portion of the selected rerouting traffic trunk that contributes non-original traffic to the corresponding identified congested network link from the network to reduce the congestion of the network.

10. The method of claim 9, wherein the selected rerouting traffic trunk is selected from the list of traffic trunks, starting with a traffic trunk having a greatest volume of non-original traffic contribution to the traffic of the corresponding congested network link.

11. The method of claim 9, further comprising:
a) generating a residue capacity for all the network links of the network after the non-original traffic contribution of the selected rerouting traffic trunk is removed from the corresponding congested network link;
b) generating a modified residue capacity for all the network links based on the residue capacity and non-original traffic contribution of the selected rerouting traffic trunk; and
c) generating a label switching path (LSP) having an LSP residue capacity for the non-original traffic portion of the selected rerouting traffic trunk.

12. The method of claim 11, further comprising:
d) adding the LSP of step c to route the non-original traffic portion of the selected rerouting traffic trunk;
e) adding the LSP residue capacity as added traffic to the network;
f). generating a new residue capacity for all the network links based on the network links' residue capacity and the added traffic;
g) generating another LSP having another LSP residue capacity for another non-original traffic portion of the selected rerouting traffic trunk if the added LSP residue capacity is less than the non-original traffic portion of the selected rerouting traffic trunk;
h) repeating steps d–g until either traffic of the identified congested traffic link is approximately less than or equal to the predetermined parameter, or until a predetermined maximum number of LSPs has been reached;
i) selecting a next traffic trunk from the list and removing a non-original traffic portion contribution of the next traffic trunk that contributes to the corresponding identified congested network link from the network, if the maximum number of LSPs has not been reached; and
j) repeating steps a–i until all non-original traffic of the rerouting traffic trunks have been routed with LSPs or until the maximum number of LSPs has been reached.

13. The method as in claim 12, wherein the LSPs are selected in greatest residue capacity order, the method further comprising:
k) generating a PATH node list and a TENT node list for building a path from an ingress node of the selected rerouting traffic trunk to an egressing node of the selected rerouting traffic trunk, wherein the PATH comprises:
l) starting a first node set best path from the ingress node of the selected ingressing rerouting traffic trunk;
m) finding all nearest neighbor nodes not in the first node set;
n) placing all nearest node neighbors in a second node set ordered based on their maximum modified residue capacity;
o) removing a lead node in the second node set;
p) updating the first node set with the lead node if the lead node is not an egressing node and deleting all nodes with a same node id as the lead node from the second node set;
q) repeating steps m–p until the lead node is an egressing node; and
r) constructing a best path alternate LSP from the nodes listed in the first node set.

14. A multi-protocol label switching (MPLS) device in a network comprising:
a congestion identifying device, wherein the congestion identifying device identifies a congestion of network links by determining that link utilization exceeds a predetermined traffic load parameter, wherein the predetermined traffic load parameter is a maximum link utilization, the maximum link utilization associated with all of the links and associated with a bandwidth that is below a maximum capacity of the link;
a contributing traffic trunk identifying device, wherein the contributing traffic trunk identifying device identifies traffic trunks that contribute to the congestion of the congested network links; and
a LSP selector device, wherein the LSP selector device selects rerouting LSP traffic paths for the identified traffic trunks to reduce the traffic of the congested network links sufficient to reduce link utilization below the predetermined traffic load parameter.

15. The device according to claim 14, wherein the contributing traffic trunk identifying device:
generates a minimum traffic off-load volume $V_l$, for each of the congested network links l=1, 2, . . . L, where L is the total number of congested network links, that brings a traffic load of a network link l to below the traffic load parameter;
generates a list of traffic trunks corresponding to each of the identified congested network links where each of the traffic trunks in the list contributes to traffic of a corresponding identified congested network link;
selects a traffic trunk from the list based on contribution of the selected traffic trunk to the traffic of the corresponding congested network link as a rerouting traffic trunk; and
removes a traffic portion of the selected rerouting traffic trunk that contributes to the corresponding identified congested network link from the network.

16. The device of claim 15, wherein the contributing traffic trunk identifying device selects a rerouting traffic trunk from the list of traffic trunks, starting with a traffic trunk having a greatest volume of traffic contribution to the traffic of the corresponding congested network link.

17. The device of claim 16, wherein the LSP selector device:
a) generates a residue capacity for all the network links of the network after the traffic contribution of the selected rerouting traffic trunk is removed from the corresponding congested network link;
b) generates a modified residue capacity for all the network links based on the residue capacity and traffic contribution of the selected rerouting traffic trunk; and c) generates a label switching path (LSP) having an LSP residue capacity or the traffic portion of the selected rerouting traffic trunk.

18. The device of claim 17, wherein the LSP selector device:

d). adds the LSP of step c to route the traffic portion of the selected rerouting traffic trunk;

e) adds the LSP residue capacity as added traffic to the network;

f) generates a new residue capacity for all the network links based on the residue capacity and the added traffic;

g) generates another LSP having another LSP residue capacity for another traffic portion of the selected rerouting traffic trunk if the LSP residue capacity is less than the traffic portion of the selected rerouting traffic trunk;

h) repeats steps d–g until either new traffic of the identified congested traffic link is approximately less than or equal to the predetermined parameter, or until a predetermined maximum number of LSPs has been reached;

i) selects a next traffic trunk from the list and removes a traffic portion contribution of the next traffic trunk that contributes to the corresponding identified congested network link from the network, if the maximum number of LSPs has not been reached; and j) repeats steps a–i until all traffic of the rerouting traffic trunks have been routed with LSPs or until the maximum number of LSPs has been reached.

19. The device as in claim 18, wherein the LSP selector device selects LSPs in greatest residue capacity order, wherein the LSP selector:

k) generates a PATH node list and a TENT node list for building a path from an ingress node of the selected rerouting traffic trunk to an egressing node of the selected rerouting traffic trunk;

l) starts a first node set path from the ingress node of the selected ingressing rerouting traffic trunk;

m) finds all nearest neighbor nodes not in the first node set;

n) places all nearest node neighbors in a second node set ordered based on their maximum modified residue capacity;

o) removes a lead node in the second node set;

p) updates the first node set with the lead node if the lead node is not an egressing node and deletes all nodes with a same node id as the lead node from the second node set;

q) repeats steps m–p until the lead node is an egressing node; and r) constructs a best path primary LSP from the nodes listed in the first node set.

20. A device for routing network traffic of a network, comprising:

a congestion identifying device, wherein the congestion identifying device:

generates, in the event of a single network link failure case n=1, 2, . . . k, where k is a number of all the links in the network, a traffic road map generated based on a first routing technique; and identifies one or more network links as congested, by determining that link utilization exceeds a predetermined traffic load parameter, wherein the predetermined traffic load parameter is a maximum link utilization, the maximum link utilization associated with all of the links and associated with a bandwidth that is below a maximum capacity of the link; and a LSP selector device, wherein the LSP selector device reroutes portions of the traffic that contribute to the identified congested links sufficient to reduce link utilization below said predetermined traffic load parameter.

21. The device of claim 20, wherein the congestion identifying device:

identifies traffic trunks that contribute to traffic of the identified congested network links; and the LSP selector device selects rerouting traffic trunks where each of the rerouting traffic trunks contributes to a non-original traffic of the identified congested network links.

22. The device of claim 21, wherein the predetermined parameter is a traffic load parameter, and wherein the congestion identifying device:

generates a minimum non-original traffic off-load volume Vl(n) for each of the identified congested network links l=1, 2, 3, . . . L, where L is the total number of congested network links, that brings the non-original traffic load of network link l to below the traffic load parameter;

generates a list of traffic trunks corresponding to each of the identified congested network links, where each of the traffic trunks in the list contributes to the non-original traffic of a corresponding identified congested network link;

selects a traffic trunk from the list based on its non-original traffic contribution to the traffic of the corresponding congested network link as a rerouting traffic trunk; and removes a traffic portion of the selected rerouting traffic trunk that contributes non-original traffic to the corresponding identified congested network link from the network.

23. The device of claim 22, wherein the selected rerouting traffic trunk is selected from the list of traffic trunks, starting with a traffic trunk having a greatest volume of non-original traffic contribution to the traffic of the corresponding congested network link.

24. The device of claim 22, wherein the LSP selector device:

a) generates a residue capacity for all the network links of the network after the non-original traffic contribution of the selected rerouting traffic trunk is removed from the corresponding congested network link;

b) generates a modified residue capacity for all the network links based on the residue capacity and non-original traffic contribution of the selected rerouting traffic trunk; and c) generates a label switching path (LSP) having an LSP residue capacity for the non-original traffic portion of the selected rerouting traffic trunk.

25. The device of claim 24 wherein the LSP selector device:

d) adds the LSP of step c to route the non-original traffic portion of the selected rerouting traffic trunk;

e) adds the LSP residue capacity as added traffic to the network;

f) generates a new residue capacity for all the network links based on the network links' residue capacity and the added traffic;

g) generates another LSP having another LSP residue capacity for another non-original traffic portion of the selected rerouting traffic trunk if the added LSP residue capacity is less than the non-original traffic portion of the selected rerouting traffic trunk;

h) repeats steps d–g until either traffic of the identified congested traffic link is approximately less than or equal to the predetermined parameter, or until a pre-determined maximum number of LSPs has been reached;

i) selects a next traffic trunk from the list and removes a non-original traffic portion contribution of the next traffic trunk that contributes to the corresponding identified congested network link from the network, if the maximum number of LSPs has not been reached; and j) repeats steps a–i until all non-original traffic of the rerouting traffic trunks have been routed with LSPs or until the maximum number of LPSs has been reached.

26. The device as in claim 25, wherein LSP selector device selects the LSPs in greatest residue capacity order and:

k) generates a PATH node list and a TENT node list for building a path from an ingress node of the selected rerouting traffic trunk to an egressing node of the selected rerouting traffic;

l) starts a first node set path from the ingress node of the selected ingressing rerouting traffic trunk;

m) finds all nearest neighbor nodes not in the first node set;

n) places all nearest node neighbors in a second node set ordered based on their maximum modified residue capacity;

o) removes a lead node in the second node set;

p) updates the first node set with the lead node if the lead node is not an egressing node and deletes all nodes with a same node id as the lead node from the second node set;

q) repeats steps m–p until the lead node is an egressing node; and r) constructs a best path alternate LSP from the nodes listed in the first node set.

27. The device according to claim 26, wherein the LSP selector device generates alternate LSPs, wherein the alternate LSPs do not include a path in a primary LSP.

28. The device according to claim 19, further comprising:

a configuration template generator that generates a configuration template for building path circuits corresponding to the paths selected by the LSP selector device.

29. The device according to claim 14, wherein the actions of the congestion identifying device, the contributing traffic trunk identifying device and the LSP selector device, are performed by a computer.

30. The method according to claim 6, wherein the steps are stored in a memory.

31. The method according to claim 13, wherein the steps are stored in a memory.

* * * * *